(12) United States Patent
Zhang et al.

(10) Patent No.: US 11,939,014 B2
(45) Date of Patent: Mar. 26, 2024

(54) SYSTEM AND METHOD OF ADJUSTING STEERING DAMPING BASED ON SOUND FREQUENCY ANALYSIS

(71) Applicants: Hyundai Motor Company, Seoul (KR); Kia Corporation, Seoul (KR)

(72) Inventors: Zai Xu Zhang, Shandong (CN); Rui Song, Shandong (CN); Xu Meng Xu, Shandong (CN); Seoktae Son, Seoul (KR); Jie Hui Huang, Shandong (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 216 days.

(21) Appl. No.: 17/690,225

(22) Filed: Mar. 9, 2022

(65) Prior Publication Data
US 2022/0289289 A1    Sep. 15, 2022

(30) Foreign Application Priority Data
Mar. 11, 2021    (CN) .......................... 202110265181.0

(51) Int. Cl.
*B62D 6/00*    (2006.01)
(52) U.S. Cl.
CPC ............. *B62D 6/008* (2013.01); *B62D 6/001* (2013.01); *B62D 6/007* (2013.01)

(58) Field of Classification Search
CPC ......... B62D 6/008; B62D 6/001; B62D 6/007
See application file for complete search history.

(56) References Cited

U.S. PATENT DOCUMENTS

| 2015/0047495 A1* | 2/2015 | Neitzke .................. G10H 1/18 84/609 |
| 2015/0073658 A1* | 3/2015 | Stoof ..................... B60G 17/06 701/37 |
| 2017/0129298 A1* | 5/2017 | Lu ......................... B60G 17/015 |
| 2017/0285641 A1* | 10/2017 | Goldman-Shenhar ..................... B60W 60/00136 |

\* cited by examiner

*Primary Examiner* — Khoi H Tran
*Assistant Examiner* — Tristan J Greiner
(74) *Attorney, Agent, or Firm* — Fox Rothschild LLP

(57) ABSTRACT

A system for adjusting steering damping based on sound frequency analysis includes: an acoustic main body configured to play music and determine whether the music is being played; a sound collection device configured to collect a sound signal of the music being played; a sound frequency analysis device configured to receive the sound signal of the music collected by the sound collection device and determine whether the collected music has a strong beat; and a power steering electronic control unit electrically connected to the sound frequency analysis device and configured to receive a determination result of the sound frequency analysis device and adjust the steering damping according to the received determination result of the sound frequency analysis device.

16 Claims, 3 Drawing Sheets

SYSTEM AND METHOD OF ADJUSTING STEERING DAMPING BASED ON SOUND FREQUENCY ANALYSIS

CROSS-REFERENCE TO RELATED APPLICATION

This application claims under 35 U.S.C. § 119(a) the benefit of Chinese Patent Application No. 202110265181.0 filed in the Chinese National Intellectual Property Administration on Mar. 11, 2021, the entire contents of which are incorporated herein by reference.

BACKGROUND

(a) Technical Field

The present disclosure relates to driving control of a vehicle, more particularly, to a system and a method for adjusting steering damping based on sound frequency analysis.

(b) Description of the Related Art

Many people play music while driving a vehicle, where certain music may have a strong beat, such as rock music or hip hop, which may increase a feeling of intensity by a driver. When playing music with a strong beat, for example, the driver typically makes small movements according to the beat of the music, which may cause steering errors and accidents, thereby affecting driving safety.

Therefore, there is a need for a technology for preventing steering errors and accidents by analyzing sound frequency of music, in order to determine whether the music has a strong beat (for example, rock music or hip hop), and optimizing steering damping according to a type of the music.

The above information disclosed in this Background section is only for enhancement of understanding of the background of the disclosure, and therefore it may contain information that does not form the prior art that is already known in this country to a person of ordinary skill in the art.

SUMMARY

To solve the problems existing in the conventional arts, exemplary embodiments of the present disclosure provide a device and a method for adjusting steering damping based on sound frequency analysis.

An exemplary embodiment of the present disclosure provides a system for adjusting steering damping based on sound frequency analysis, the system including an acoustic main body configured to play music and determine whether music is being played; a sound collection device configured to collect a sound signal of the music being played; a sound frequency analysis device configured to receive the sound signal of the music collected by the sound collection device and determine whether the collected music has a strong beat; and a power steering electronic control unit electrically connected to the sound frequency analysis device and configured to receive a determination result of the sound frequency analysis device and adjust the steering damping according to the received determination result of the sound frequency analysis device.

Preferably, the power steering electronic control unit increases the steering damping if it is determined that the collected music has the strong beat from a determination result signal received from the sound frequency analysis device; and maintains the steering damping if it is determined that the collected music does not have the strong beat from the determination result signal received from the sound frequency analysis device.

Preferably, the power steering electric control unit determines whether a vehicle uses a power steering with a driving mode switching function if it is determined that the collected music has the strong beat from the determination result signal received from the sound frequency analysis device; and changes a driving mode of the power steering to a sports mode if it is determined that the vehicle uses the power steering with the driving mode switching function.

Preferably, if it is determined that the vehicle does not use the power steering with the driving mode switching function, the power steering electric control unit increases the steering damping by decreasing an input current of a steering motor in the case that the power steering is an electric power steering; and increases the steering damping by opening an electromagnetic valve in the case that the power steering is an electrically-controlled hydraulic power steering.

Preferably, the sound frequency analysis device performs Fourier transform on the sound signal of the collected music; and determines whether the collected music has the strong beat according to a sound frequency of the sound signal subjected to the Fourier transform.

Preferably, the sound frequency analysis device determines that the collected music has the strong beat if the sound frequency of the sound signal subjected to the Fourier transform is continuous within one time period and within one frequency range.

Preferably, the one time period is set to a fixed length of time and the fixed length of time ranges from 5 s to 10 s; and the one frequency range includes 20 Hz to 300 Hz.

Preferably, the acoustic main body, the sound collection device, the sound frequency analysis device, and the power steering electronic control units communicates with each other via Controller Area Network (CAN) communication.

Another embodiment of the present disclosure provides a method for adjusting steering damping based on sound frequency analysis, the method including determining whether music is being played by an acoustic main body; collecting a sound signal of the music being played by a sound collection device; receiving the sound signal of the music collected by the sound collection device and determining whether the collected music has a strong beat, by a sound frequency analysis device; and receiving a determination result of the sound frequency analysis device and adjusting the steering damping according to the received determination result of the sound frequency analysis device, by a power steering electronic control unit.

Preferably, the power steering electronic control unit increases the steering damping if it is determined that the collected music has the strong beat from a determination result signal received from the sound frequency analysis device; and maintains the steering damping if it is determined that the collected music does not have the strong beat from the determination result signal received from the sound frequency analysis device.

Preferably, the power steering electronic control unit determines whether a vehicle uses a power steering with a driving mode switching function if it is determined that the collected music has the strong beat from the determination result signal received from the sound frequency analysis device; and in the case that it is determined that the vehicle uses the power steering with the driving mode switching function, the power steering electronic control unit changes a driving mode of the power steering to a sports mode by the power steering electronic control unit.

Preferably, if it is determined that the vehicle does not use the power steering with the driving mode switching function, the power steering electronic control unit increases the steering damping by decreasing an input current of a steering motor in the case that the power steering is an electric power steering; and the power steering electronic control unit increases the steering damping by controlling an electromagnetic valve to open in the case that the power steering is an electrically-controlled hydraulic power steering.

Preferably, the sound frequency analysis device performs Fourier transform on the received sound signal of the music; and determines whether the collected music has the strong beat according to the sound frequency of the sound signal subjected to the Fourier transform.

Preferably, if the sound frequency of the sound signal subjected to the Fourier transform is continuous within one time period and within one frequency range, the sound frequency analysis device determines that the collected music has the strong beat.

Preferably, the one time period is set to a fixed length of time and the fixed length of time is 5 s to 10 s; and the frequency range incudes 20 Hz to 300 Hz.

Preferably, the acoustic main body, the sound collection device, the sound frequency analysis device, and the power steering electronic control unit communicates with each other via CAN communication.

Exemplary embodiments of the present disclosure provide the above technical solutions, resulting in the following beneficial effects.

According to an exemplary embodiment of the present disclosure, it is possible to increase the safety of intense driving which the music with a strong beat can cause. For example, in the environment of the music with a strong beat such as rock music and hip hop, it is possible to minimize errors of steering operation caused by the driver making small movements. Further, it is possible to minimize steering deviation caused by the driver making small movements according to the bits and unconsciously increasing a steering width of a direction plate. According to an embodiment of the present disclosure, it is possible to increase the safety of intense driving according to the music with a strong beat by increasing the steering damping when playing the music with a strong beat.

BRIEF DESCRIPTION OF THE DRAWINGS

The following description provides detailed descriptions of exemplary embodiments of the present disclosure in conjunction with the accompanying drawings. For clarity, the same reference number is used to refer to the same feature in different drawings. It should be understood that the drawings are merely exemplary and are not made to scale.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail. The exemplary embodiments are implemented on the premise of technical solutions of the present disclosure, and detailed implementations and specific operations are described, but the scope of the present disclosure is not limited to the following exemplary embodiments.

Figure 1:
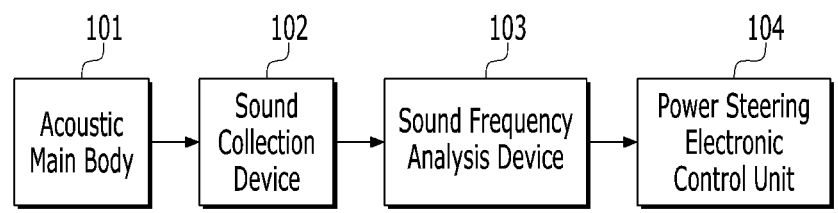
FIG. 1 is a block diagram of a system for adjusting steering damping based on sound frequency analysis according to an exemplary embodiment of the present disclosure.

FIG. 1 is a block diagram of a system for adjusting steering damping based on sound frequency analysis according to an exemplary embodiment of the present disclosure. A system for adjusting steering damping based on sound frequency analysis according to an embodiment of the present disclosure includes an acoustic main body 101, a sound collection device 102, a sound frequency analysis device 103, and a power steering electronic control unit 104.

The acoustic main body 101 may be installed in a vehicle, in which an in-vehicle entertainment system is integrated, play music or the like, and determine whether music is being played.

The sound collection device 102 may collect a sound signal of the music being played. The sound collection device 102 may include a microphone, but exemplary embodiments of the present disclosure are not limited thereto.

The sound frequency analysis device 103 may receive the sound signal of the music collected by the sound collection device 102 and determine whether the collected music has a strong beat. The music with a strong beat may be rock music or hip hop, for example.

The power steering electronic control unit 104 may receive a determination result of the sound frequency analysis device 103 and adjust steering damping according to the determination result of the sound frequency analysis device 103. In the case that it is determined from a determination result signal received from the sound frequency analysis device 103 that the collected music is not the music with a strong beat, the power steering electronic control unit 103 maintains the steering damping. In the case that it is determined from the determination result signal received from the sound frequency analysis device 103 that the collected music is the music with a strong beat, the power steering electronic control unit 104 increases the steering damping.

If it is determined from the determination result signal received from the sound frequency analysis device 103 that the collected music has a strong beat, the power steering electronic control unit 104 may determine whether the vehicle uses a power steering with a driving mode switching function.

If it is determined that the vehicle uses the power steering with the driving mode switching function, a driving mode of the power steering may be changed into a sports mode. If it is determined that the vehicle does not use the power steering with the driving mode switching function, the power steering electronic control unit 104 may reduce input current of a steering motor to increase steering moment in a case that the power steering is an electric power steering; and the power steering electronic control unit 104 may open an electromagnetic valve to increase the steering moment in a case that the power steering is an electrically-controlled hydraulic power steering.

In addition, a user of the vehicle may turn off a frequency detection function of the sound from the acoustic main body 101.

According to an exemplary embodiment of the present disclosure, the acoustic main body 101, the sound collection device 102, the sound frequency analysis device 103, and the power steering electronic control unit 104 may communicate with each other via Controller Area Network (CAN) communication. However, the communication network according to an exemplary embodiment of the present disclosure is not limited thereto.

Therefore, the system for adjusting steering damping based on the sound frequency analysis according to the exemplary embodiment of the present disclosure analyzes a sound frequency of the music being played, particularly a bass frequency (for example, 20 Hz to 30 Hz) to determine whether the music being played is the music with a strong beat, and adjusts the steering damping based on the determination on whether the music is the music with a strong beat, thereby ensuring safety of vehicle driving.

Figure 2:
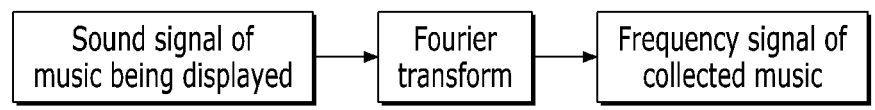
FIG. 2 is a schematic diagram showing processing of a music signal performed by a system for adjusting steering damping based on sound frequency analysis according to an exemplary embodiment of the present disclosure.

FIG. 2 is a schematic diagram showing processing of a music signal performed by a system for adjusting steering damping based on sound frequency analysis according to an exemplary embodiment of the present disclosure.

According to an exemplary embodiment of the present disclosure, the acoustic main body 101 plays the music; the sound collection device 102 collects the sound signal of the music being played; and the sound frequency analysis device 103 receives the sound signal of the music collected by the sound collection device 102, performs Fourier transform on the collected sound signal, determines whether the collected music is the music with a strong beat according to the sound frequency of the sound signal subjected to the Fourier transform, and sends the determination result signal to the power steering electronic control unit 104.

If the sound frequency of the sound signal subjected to the Fourier transform is continuous within one time period and within one frequency range, the collected music is determined to be the music with a strong beat, and the music with a strong beat may be, for example, rock music or hip hop.

The time period may include 5 s to 10 s, and an exemplary embodiment of the present disclosure is not limited thereto. The one frequency range may include 20 Hz to 300 Hz, but the frequency range of an exemplary embodiment of the present disclosure is not limited thereto.

According to an exemplary embodiment of the present disclosure, the music with the sound frequency of 20 Hz to 300 Hz has a relatively strong beat (for example, sounds of guitar and drums in rock music), and other types of music such as hip hop use a large amount of low notes (for example, 20 Hz to 60 Hz), which may excite the driver even more.

Figure 3:
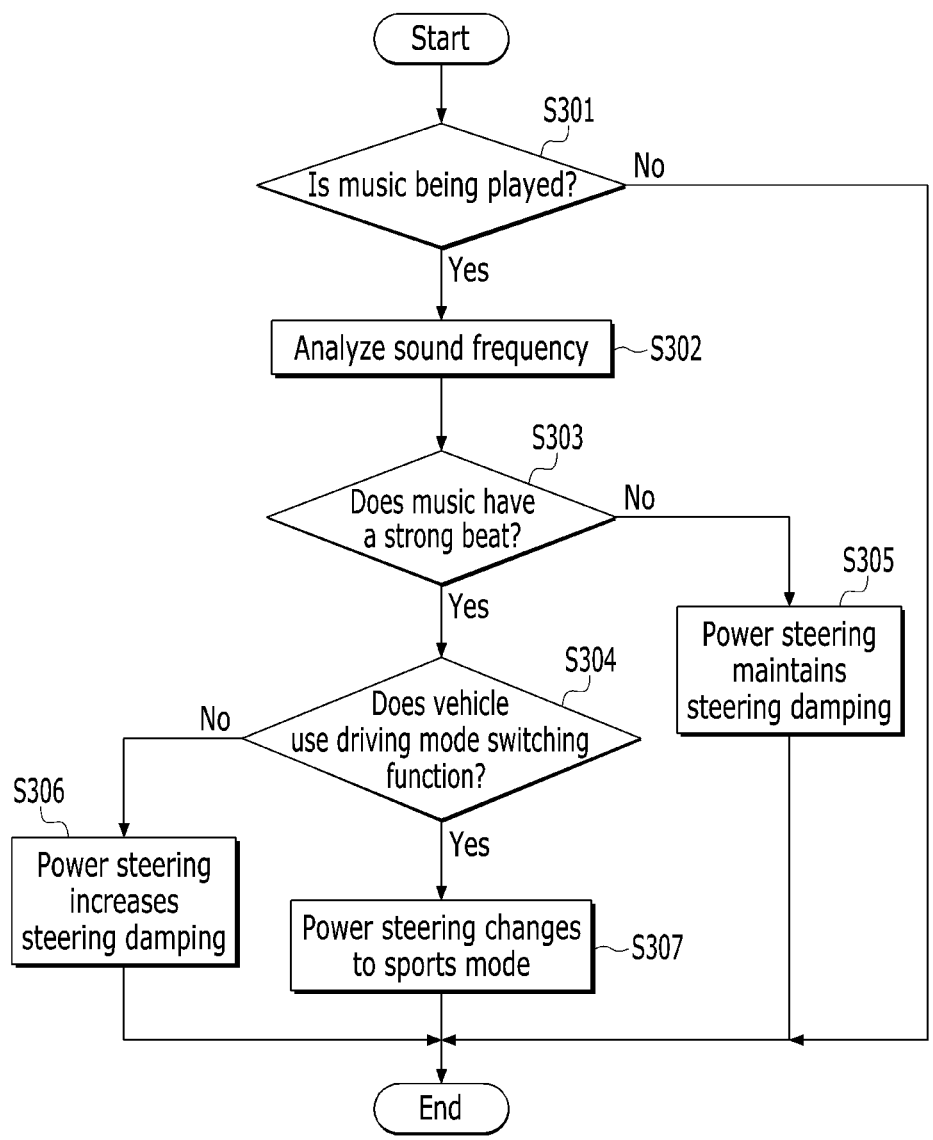
FIG. 3 is a flowchart of a method of adjusting steering damping based on sound frequency analysis according to an exemplary embodiment of the present disclosure.

FIG. 3 is a flowchart showing a method of adjusting steering damping based on sound frequency analysis according to an exemplary embodiment of the present disclosure.

As shown in FIG. 3, in step S301, the acoustic main body 101 may determine whether the music is being played. If it is determined that the music is being played, the sound collection device 102 is operated to collect the sound signal of the music being played. The sound signal of the collected music is transmitted to the sound frequency analysis device 103.

In step S302, the sound frequency analysis device 103 receives the sound signal of the music collected by the sound collection device 102, and performs Fourier transform on the sound signal of the collected music.

In step S303, the sound frequency analysis device 103 determines whether the collected music is the music with a strong beat according to the sound frequency of the sound signal subjected to the Fourier transform. Here, the music with a strong beat may be, for example, rock music or hip hop.

If the sound frequency of the sound signal subjected to the Fourier transform is continuous within the one time period and within the one frequency range, it is determined that the collected music is the music with a strong beat.

The one time period may include 5 s to 10 s, and an exemplary embodiment of the present disclosure is not limited thereto. The one frequency range may include 20 Hz to 300 Hz, but the frequency range of an exemplary embodiment of the present disclosure is not limited thereto.

If it is determined that the collected music is not the music with a strong beat, the power steering electronic control unit 104 maintains the steering damping in step S305.

If it is determined that the collected music is the music with a strong beat, the power steering electronic control unit 104 determines whether the vehicle uses the power steering with the driving mode switching function in step S304.

If the vehicle uses the power steering with the driving mode switching function, the power steering electronic control unit 104 changes the vehicle driving mode of the power steering into the sports mode in step S307.

If the vehicle does not use the power steering with the driving mode switching function, the power steering electronic control unit 104 increases the steering damping in step S306.

Further, in the step S306, in other words, if the vehicle does not use the power steering with the driving mode switching function, the power steering electronic control unit 104 may reduce the input current of the steering motor to increase rotation torque in the case that the power steering is the electric power steering, and the power steering electronic control unit 104 may open the electromagnetic valve to increase the rotation torque in the case that the power steering is the electrically-controlled hydraulic power steering.

In addition, the user of the vehicle may turn off a function of adjusting the steering damping based on the sound frequency analysis.

The method for adjusting the steering damping based on the sound frequency analysis according to an exemplary embodiment of the present disclosure increases the steering damping when playing the music with a strong beat, thereby capable of increasing the safety of intense driving due to the music with a strong beat.

Although the implementation of the present disclosure has been described as a series of steps for clarity, it is not limited to the order in which the steps are performed, and individual steps may be performed simultaneously or in a different order if necessary. In order to carry out the method according to the present disclosure, the illustrated steps may further include other steps, and may include other steps excluding some steps or other additional steps instead of the some steps.

The exemplary embodiments of the present disclosure do not exemplify all possible combinations, but describe representative aspects of the present disclosure, and the features of each implementation can be applied independently or in combination of two or more.

In addition, each exemplary embodiment of the present disclosure may be implemented in hardware, firmware, software, or combinations thereof. The exemplary embodiments of the present disclosure may be implemented as hardware including one or more of an application specific integrated circuit (ASIC), a digital signal processor (DSP), a digital signal processing device (DSPD), a programmable logic device (PLD), a field programmable gate array (FPGA), a general-purpose processor, a controller, a microcontroller, and a microprocessor.

The scope of the present disclosure includes software or machine-executable instructions (for example, an operating system, an application program, a firmware, a program, etc.) and a non-volatile computer-readable medium. The software or the machine-executable instructions may be executed by a device or a computer according to each implementation. The non-volatile computer readable medium is executable on a computer or equipment storing such software or instructions.

The descriptions of the exemplary embodiments are for explaining the technical solutions of the present disclosure, and are not intended to be exhaustive. The present disclosure should not be limited only to the precise form of the descriptions. Of course, changes and modifications made in accordance with teachings and instructions according to the above disclosure are all possible for those skilled in the art.

The exemplary embodiments have been selected and described to interpret the characteristic principles and practical applications of the present disclosure so that those skilled in the art can easily understand, realize, and utilize each exemplary embodiment of the present disclosure, other optional embodiments, and their modified forms. The protection scope of the present disclosure should be within the scope of the appended claims and equivalents thereof

What is claimed is:

1. A system for adjusting steering damping based on sound frequency analysis, the system comprising:
   an acoustic main body configured to play music and determine whether the music is being played;
   a sound collection device configured to collect a sound signal of the music being played;
   a sound frequency analysis device configured to receive the sound signal of the music collected by the sound collection device and determine whether the collected music has a strong beat; and
   a power steering electronic control unit electrically connected to the sound frequency analysis device and configured to receive a determination result of the sound frequency analysis device and adjust the steering damping according to the received determination result of the sound frequency analysis device.

2. The system of claim 1, wherein the power steering electric control unit is configured to:
   increase the steering damping if it is determined that the collected music has the strong beat from a determination result signal received from the sound frequency analysis device; and
   maintain the steering damping if it is determined that the collected music does not have the strong beat from the determination result signal received from the sound frequency analysis device.

3. The system of claim 2, wherein the power steering electric control unit is configured to:
   determine whether a vehicle uses a power steering with a driving mode switching function if it is determined that the collected music has the strong beat from the determination result signal received from the sound frequency analysis device; and
   change a driving mode of the power steering to a sports mode if it is determined that the vehicle uses the power steering with the driving mode switching function.

4. The system of claim 3, wherein, if it is determined that the vehicle does not use the power steering with the driving mode switching function, the power steering electric control unit is configured to:
   increase the steering damping by decreasing an input current of a steering motor in the case that the power steering is an electric power steering; and
   increase the steering damping by opening an electromagnetic valve in the case that the power steering is an electrically-controlled hydraulic power steering.

5. The system of claim 1, wherein the sound frequency analysis device is configured to:
   perform Fourier transform on the sound signal of the collected music; and
   determine whether the collected music has the strong beat according to a sound frequency of the sound signal subjected to the Fourier transform.

6. The system of claim 5, wherein the sound frequency analysis device is configured to determine that the collected music has the strong beat if the sound frequency of the sound signal subjected to the Fourier transform is continuous within one time period and within one frequency range.

7. The system of claim 6, wherein the one time period is set to a fixed length of time and the fixed length of time ranges from 5 s to 10 s; and the one frequency range includes 20 Hz to 300 Hz.

8. The system of claim 1, wherein the acoustic main body, the sound collection device, the sound frequency analysis device, and the power steering electronic control unit communicate with each other via CAN communication.

9. A method for adjusting steering damping based on sound frequency analysis device, the method comprising:
determining whether music is being played by an acoustic main body;
collecting a sound signal of the music being played by a sound collection device;
receiving the sound signal of the music collected by the sound collection device and determining whether the collected music has a strong beat, by a sound frequency analysis device; and
receiving a determination result of the sound frequency analysis device and adjusting the steering damping according to the received determination result of the sound frequency analysis device, by a power steering electronic control unit.

10. The method of claim 9, further comprising:
increasing the steering damping by the power steering electronic control unit if it is determined that the collected music has the strong beat from a determination result signal received from the sound frequency analysis device; and
maintaining the steering damping by the power steering electronic control unit if it is determined that the collected music does not have the strong beat from the determination result signal received from the sound frequency analysis device.

11. The method of claim 10, further comprising:
determining, by the power steering electronic control unit, whether a vehicle uses a power steering with a driving mode switching function if it is determined that the collected music has the strong beat from the determination result signal received from the sound frequency analysis device; and
in the case that it is determined that the vehicle uses the power steering with the driving mode switching function, changing a driving mode of the power steering to a sports mode by the power steering electronic control unit.

12. The method of claim 11, wherein if it is determined that the vehicle does not use the power steering with the driving mode switching function, further comprising:
in the case that the power steering is an electric power steering, increasing, by the power steering electronic control unit, the steering damping by decreasing an input current of a steering motor; and
in the case that the power steering is an electrically-controlled hydraulic power steering, increasing, by the power steering electronic control unit, the steering damping by controlling an electromagnetic valve to open.

13. The method of claim 9, further comprising:
performing, by the sound frequency analysis device, Fourier transform on the sound signal of the collected music; and
determining, by the sound frequency analysis device, whether the collected music has the strong beat according to the sound frequency of the sound signal subjected to the Fourier transform.

14. The method of claim 13, further comprising:
determining, by the sound frequency analysis device, that the collected music has the strong beat if the sound frequency of the sound signal subjected to the Fourier transform is continuous within one time period and within one frequency range.

15. The method of claim 14, wherein:
the one time period is set to a fixed length of time and the fixed length of time is 5 s to 10 s; and
the frequency range incudes 20 Hz to 300 Hz.

16. The method of claim 9, wherein the acoustic main body, the sound collection device, the sound frequency analysis device, and the power steering electronic control unit communicate with each other via CAN communication.

* * * * *